United States Patent [19]
Adachi et al.

[11] Patent Number: 5,789,114
[45] Date of Patent: Aug. 4, 1998

[54] ACTIVE MATERIALS FOR A SECONDARY CELL, A METHOD FOR MAKING THE SAME, POSITIVE ELECTRODES FOR A SECONDARY CELL COMPRISING THE ACTIVE MATERIAL, AND A NON-AQUEOUS ELECTROLYTIC SECONDARY CELL

[75] Inventors: Norikazu Adachi, Nagoya; Hisanao Kojima, Kariya, both of Japan

[73] Assignee: Nippondenso Co., Ltd., Kariya, Japan

[21] Appl. No.: 717,097

[22] Filed: Sep. 20, 1996

[30] Foreign Application Priority Data

Sep. 22, 1995 [JP] Japan .................. 7-244755

[51] Int. Cl.⁶ ............................. H01M 4/62
[52] U.S. Cl. ............ 429/232; 427/122; 427/197; 427/215
[58] Field of Search ............... 427/197, 215, 427/122; 429/232

[56] References Cited

U.S. PATENT DOCUMENTS

| | | | |
|---|---|---|---|
| 3,042,732 | 7/1962 | Kordesch | 429/232 X |
| 5,441,833 | 8/1995 | Furukawa | 429/232 X |
| 5,482,797 | 1/1996 | Yamada et al. | 429/232 X |
| 5,503,946 | 4/1996 | Fauteux et al. | 427/122 X |

FOREIGN PATENT DOCUMENTS

| | | |
|---|---|---|
| 61-214362 | 9/1986 | Japan. |
| 6-187984 | 7/1994 | Japan. |
| 7-36332 | 4/1995 | Japan. |

*Primary Examiner*—Stephen Kalafut
*Attorney, Agent, or Firm*—Cushman Darby & Cushman IP Group of Pillsbury Madison & Sutro LLP

[57] ABSTRACT

An active material for a positive electrode of a secondary cell comprises particles of a metal oxide and a conductive layer formed on the surfaces of individual particles of the metal oxide and made of a carbon powder which has a specific surface area of at least 150 $m^2/g$ when measured prior to the formation of the conductive layer. The conductive layer covers at least 15% of an apparent surface of the individual particles of the metal oxide and has a thickness ranging from 0.01 μm to 0.3 μm. The active material has a specific surface area of 3.5 $m^2/g$ to 100 $m^2/g$. A method for making the active material is also described along with a positive electrode comprising the active material and a non-aqueous electrolytic secondary cell comprising the positive electrode.

17 Claims, 5 Drawing Sheets

ACTIVE MATERIALS FOR A SECONDARY CELL, A METHOD FOR MAKING THE SAME, POSITIVE ELECTRODES FOR A SECONDARY CELL COMPRISING THE ACTIVE MATERIAL, AND A NON-AQUEOUS ELECTROLYTIC SECONDARY CELL

BACKGROUND OF THE INVENTION

1. Field of the Invention

This invention relates to active materials for a secondary cell and a method for making the same. More particularly, the invention relates to an improvement of an active material for the positive element of a secondary cell comprising an aqueous or non-aqueous electrolyte wherein metal oxides are used as the active material. The invention also relates to a method for making the active material and to a positive electrode comprising the active material. The invention further relates to a secondary cell comprising the positive electrode of the type mentioned above.

2. Description of the Prior Art

As is well known in the art, a diversity of metal oxides have been hitherto employed for an active material for the positive electrode of cells. Most of the oxides are so low in specific conductance that electric conducting agents are essential. The particles of a conducting agent are placed among metal oxide particles to impart electronic conductivity to the metal oxide thereby promoting the reduction reaction. Typical examples of the conducting agent include carbon materials.

One of the factors which influences cell characteristics and, particularly, discharge performance includes a mingling state of a metal oxide powder and a carbon material, i.e. how the carbon material and the metal oxide powder are mutually positioned. If the carbon material is not properly positioned relative to individual metal oxide particles such that good conductivity is imparted to the individual metal oxide particles, electrons are not desirably supplied to all the particles of the metal oxide. As a result, some particles remain unreacted and do not serve as an active material. This presents the problem that the utilization of the metal oxide becomes low.

If the carbon material is more uniformly mingled, the electrochemical potential which a metal oxide would inherently exhibit is not obtained. On the contrary, a mixed potential with the carbon material is observed, resulting in the lowering of a circuit potential as a cell.

Thus, the mixing state of metal oxide particles and carbon powder greatly influences the cell performance. For example, in order to facilitate the intimate contact of a carbon powder with metal oxide particles, Japanese laid-open Patent Application No. 61-214362 proposes an active material for positive electrode which consists of particles of manganese oxide individually coated with a fine powder of graphite on the surfaces thereof. Moreover, Japanese Patent Publication No. 7-36332 proposes an active material for positive electrode which comprises a metal oxide powder and an artificial graphite powder wherein a ratio in particle size between the metal oxide powder and the artificial graphite powder is in the range of $1:10^{-1}$ to $1:10^{-5}$ and a coverage of the metal oxide powder with the graphite powder is in the range of 0.5 to 15%.

SUMMARY OF THE INVENTION

It is an object of the present invention to provide an active material for a positive electrode which has an improved coverage of metal oxide particles with a carbon powder whereby secondary cells using the same are improved in performance.

It is another object of the invention to provide a method for making an active material of the type mentioned above.

It is a further object of the invention to provide a positive electrode comprising an improved active material of the type mentioned above.

It is a still further object of the invention to provide a secondary cell comprising such a positive electrode as mentioned above.

We made attempts to cover the particles of a metal oxide with a carbon material to optimize the coverage with the carbon material thereby obtaining an active material of high performance which is useful for making a positive electrode. As a result, it was found that if the covering thickness of the carbon material is made very thin, a high-performance active material could be obtained.

The above objects can be achieved, according to one embodiment of the invention, by an active material for a positive electrode of a secondary cell which comprises particles of a metal oxide and a conductive layer formed on the surfaces of individual particles of the metal oxide and made of a carbon powder which has a specific surface area of at least 150 m²/g when measured prior to the formation of the conductive layer, the conductive layer covering at least 15% of apparent surfaces of the individual particles of the metal oxide and having a thickness ranging from 0.01 μm to 0.3 μm.

According to another embodiment of the invention, there is also provided an active material for a positive electrode of a secondary cell which comprises particles of a metal oxide and a conductive layer formed on the surfaces of individual particles of the metal oxide, the conductive layer covering at least 15% of apparent surfaces of the individual particles of the metal oxide, having a thickness ranging from 0.01 μm. to 0.3 μm., and having a specific surface area ranging from 3.5 m²/g to 100 m²/g.

According to a further embodiment of the invention, there is provided a method for making an active material for a positive electrode of a secondary cell, which method comprising the steps of:

mixing particles of a metal oxide and a carbon powder having a specific surface area of at least 150 m²/g; and applying a compression shear stress to the resulting mixture to cover the surfaces of individual particles of the metal oxide with the carbon powder in a thickness of 0.01 μm to 0.3 μm so that at least 15% of an apparent surface of the individual particles is covered.

According to a still further embodiment of the invention, there is provided a positive electrode for a secondary cell which comprises a shaped body composed of particles of a metal oxide each of which has a conductive layer formed on the surfaces thereof, the conductive layer being made of a carbon material, and a resin binder for bonding the individual particles therewith, wherein the conductive layer covers at least 15% of an apparent surface of the individual particles and has a thickness ranging from 0.01 μm to 0.3 μm and a specific surface area ranging from 3.5 m²/g to 100 m²/g.

According to still another embodiment of the invention, there is provided a non-aqueous electrolytic secondary cell which comprises a negative electrode made of lithium as an active material, a positive electrode which comprises a metal oxide capable of doping and un-doping lithium as an active material, a separator for separating the negative electrode and the positive electrode from each other, and a non-aqueous liquid electrolyte impregnated in the negative electrode, the positive electrode and the separator, wherein the metal oxide is in the form of particles which individually have a conductive layer made of a carbon material in such a way that individual particles are covered with the conductive layer at at least 15% of an apparent surface thereof and that the conductive layer has a thickness ranging from 0.01 µm to 0.3 µm and a specific surface area ranging from 3.5 m²/g to 100 m²/g.

DETAILED DESCRIPTION AND EMBODIMENTS OF THE INVENTION

Figure 1A:
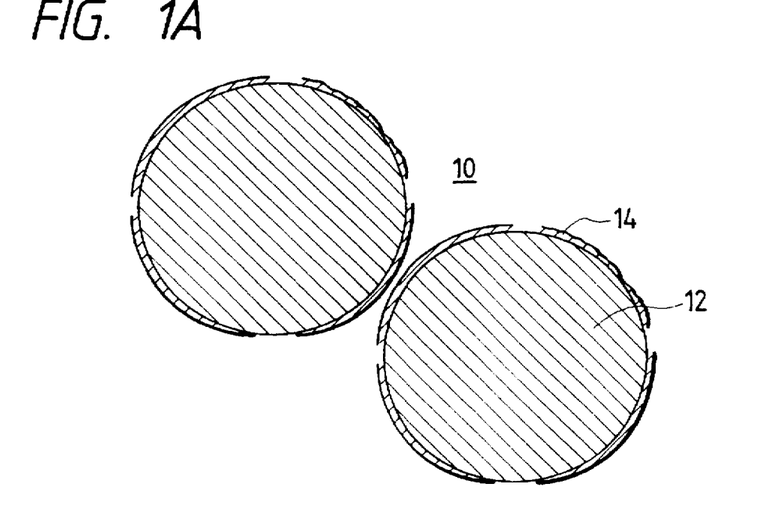
FIG. 1A is a schematic view showing particles of a metal oxide and a carbon powder layer partially formed on each particle and FIG. 1B is a schematic enlarged view of part of the covered particle.
Figure 1B:
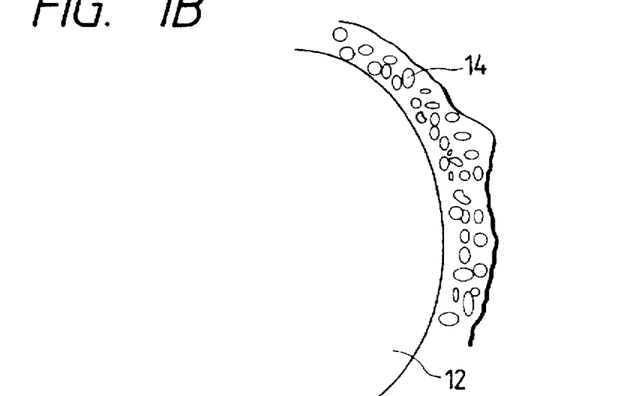

Reference is now made to the accompanying drawings and particularly to FIGS. 1A and 1B. FIG. 1A generally shows an active material 10 of the invention in the form of particles. The active material 10 includes particles 12 of a metal oxide and a carbon film 14 partially covering each particle 12 therewith as shown. In the practice of the invention, a carbon powder used should have a specific surface area of 150 m²/g or above prior to mixing with metal oxide particles. The particles 12 of a metal oxide should be covered with the carbon powder at 15% or over of an apparent surface area of individual particles 12 in a thickness of 0.01 µm to 0.3 µm. When a carbon powder having such a great specific surface area as having set out above is used to form a very thin layer on the surfaces of metal oxide particles, the resultant active material becomes high in performance. More particularly, the active material exhibits good electric conductivity and good permeability of ions such as lithium ions.

In practice, the carbon powder film 14 is formed on the particle 12 of a metal oxide as schematically enlarged in FIG. 1B.

The metal oxides used in the present invention include, for example, at least one metal oxide capable of doping and un-doping lithium ions and selected from lithium manganese oxide, lithium nickel oxide, lithium iron oxide, lithium cobalt oxide, manganese oxide and the like. These metal oxides may be used singly or in combination. These metal oxides are used in the form of particles. The particles preferably have a particle size of 0.1 to 2 µm as an average size of primary particles and a particle size of 1 to 35 µm as an average size of secondary particles.

The carbon material in the form of a powder should have a specific surface area of 150 m²/g or above. The reason why the carbon powder should have a specific surface as great at 150 m²/g or above is that the resultant carbon film at least partially covering the surfaces of the metal oxide particles becomes so porous as to exhibit good permeability of ions as well as good electric conductivity. More preferably, the carbon powder should have a specific surface area of 250 m²/g to 1500 m²/g. Examples of the carbon powder having such a high specific surface area include acetylene black, ketjen black and the like. In order to form such a thin layer of the carbon powder, it should preferably have a particle size ranging from 0.01 to 0.3 µm although depending on the particle size of a metal oxide used.

As defined above, the carbon powder should cover metal oxide particles at 15% or above with respect to the apparent surface of the particles in a thickness of 0.01 µm to 0.3 µm. It should be noted here that the term "apparent surface" of metal oxide particles is intended to mean the outer surfaces of the oxide particles, not including inner surfaces of pores or cracks formed in the inside of the particles.

The carbon powder should cover the metal oxide particles at not less than 15%, preferably 15 to 80%, of the apparent surfaces of the oxide particles. If the coverage is less than 15%, the resultant positive electrode has a reduced positive electrode initial capacity. Presumably, this is because electronic conductivity does not proceed uniformly. In contrast, if the coverage becomes too great, the ratio by weight of the carbon powder undesirably increases. Accordingly, the coverage is preferably 80% or below.

If the thickness of the carbon powder covered on the particles of a metal oxide is too great, the movement of lithium ion through the carbon powder layer becomes very slow. In this sense, the thickness is defined in the range of 0.01 µm to 0.3 µm. In order to satisfy both the electric conductivity and ion permeability, the thickness should preferably be in the range of from 0.01 µm to 0.2 µm.

The particles of the active material composed of the metal oxide particles covered with a carbon powder should have a specific surface area ranging from 3.5 m²/g to 100 m²/g. This means that the specific surface area of the conductive layer made of a carbon powder is not equal to but is substantially in the range of 3.5 m²/g to 100 m²/g.

In order to set the specific range of the conductive layer within the above range, it is essential that a starting carbon powder should have a specific surface area of at least 150 m²/g. This is for the following reason. The carbon powder is covered on the particles of a metal oxide by applying a compression shear stress to the carbon powder thereby forcing the carbon powder to be frictionally deposited on individual particles of the metal oxide. In doing so, the conductive layer of the carbon powder is partially formed on the outer surfaces of each particle of the metal oxide. The specific surface of the carbon powder formed as the conductive layer is apparently reduced in comparison with that of the starting carbon powder. Thus, the starting carbon powder should have a greater specific surface area as defined before.

The reason why the specific surface area of the active material is defined in the range of from $3.5 \, m^2/g$ to $100 \, m^2/g$ is as follows. If the specific surface area is below $2.5 \, m^2/g$, the resultant conductive layer is reduced in the number of fine pores to be formed therein, thus causing the conductivity of lithium ions through the conductive layer to be worsened. On the other hand, when the specific surface area exceeds $100 \, m^2/g$, a very great number of fine pores or voids are formed in the conductive layer. This may lead to an improved conductivity through the conductive layer but presents the following problem. In practice, metal oxide particles on which a carbon powder has been forcedly deposited to form a conductive layer are bonded together with a binder to provide a positive electrode. The binder is very likely to be taken in the great number of fine pores of the conductive layer, so that the bonding of the metal oxide particles through the binder is apt to become unsatisfactory. This will lead to a lowering of strength of the resultant positive electrode.

Thus, the active material of the invention wherein a carbon powder is covered on individual particles of a metal oxide at 15% or above of an apparent surface of the particle in a thickness of $0.01 \, \mu m$ to $0.3 \, \mu m$ so that a specific surface area of the resultant active material is in the range of $3.5 \, m^2/g$ to $100 \, m^2/g$ has the following features. Lithium ions are easily moved through the carbon conductive layer having such a great surface area. Moreover, the coverage of the carbon powder is so great that the conductivity of the active material is improved. This results in an improvement in the utilization efficiency of the metal oxide particles.

In the fabrication of a positive electrode comprising the active material of the type set out hereinbefore, a carbon powder having a specific surface area having $150 \, m^2/g$ or above is mixed with particles of a metal oxide. The resultant mixture is applied with a compression shear stress so that the particles of the metal oxide is covered with the carbon powder at 15% or above of an apparent surface of the particles in a thickness of $0.01 \, \mu m$ to $0.3 \, \mu m$.

Aside from the carbon powder, there may be further added graphite powder in order to prevent a conduction failure as will be caused by the expansion and contraction of the active material at the time of charge and discharge cycles. The graphite powder should preferably have a particle size of 1 $\mu m$ to 20 $\mu m$. The amount of the graphite powder is in the range of 0.5 to 8 parts by weight per 100 parts by weight of the metal oxide. The binder includes, for example, polyvinylidene fluoride (PVDF) and is preferably present in an amount of from 1 to 10 parts by weight per 100 parts by weight of the metal oxides.

In order to force a carbon powder to be deposited on the particles of a metal oxide at 15% or above of an apparent surface thereof, the carbon powder and the particles of a meal oxide are preferably mixed at a ratio by weight of 0.5:99.5 to 10:90. The compression shear stress is applied to the mixture to permit the carbon powder to be forcedly deposited on the metal oxide particles. The compression shear stress can be applied using a device shown in FIG. 8, which is particularly described hereinafter.

The forced deposition of the carbon powder ensures the formation of a very thin layer of the carbon powder having a thickness of $0.01 \, \mu m$ to $0.3 \, \mu m$ on the surfaces of the metal oxide.

Figure 2:
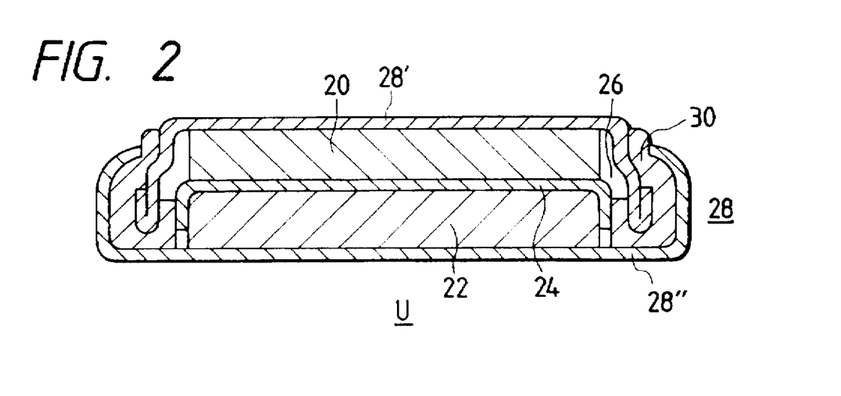
FIG. 2 is a schematic sectional view of a secondary cell according to the invention.

Reference is now made to FIG. 2 which schematically shows a non-aqueous electrolytic secondary cell which comprises a cell unit U. The cell unit U includes a negative electrode 20 comprising a lithium active material, a positive electrode 22 which comprises a metal oxide in the form of particles capable of doping and un-doping lithium, and a separator 24 separating the negative electrode 20 and the positive electrode 22 from each other. A nonaqueous liquid electrolyte 26 is sealed in a casing 28. The casing 28 includes a negative electrode can 28' and a positive electrode can 28". These cans 28', 28" are assembled through a gasket 30 so that the electrodes 20, 22, the separator 24 and the liquid electrolyte 26 are hermetically sealed in the casing 28. Thus, the electrodes 20, 22 and the separator 24 are, respectively, impregnated with the liquid electrolyte 26 in the cell.

The positive electrode 22 is of the type stated hereinbefore. The separator 24 is made of a resin film such as a polypropylene film, a polyethylene film or the like. The liquid electrolyte may be a solution of $LiPF_6$ dissolved in an organic solvent such as propylene carbonate and dimethoxyethane although any known liquid electrolytes used for this purpose may be used in the practice of the invention. The secondary cell of the invention is not critical with respect to the cell structure and any known ones may be used in the practice of the invention except that the positive electrode comprises such an active material as defined before.

The present invention is more particularly described by way of examples.

Preparation of Active Materials

An active material for a positive electrode of a lithium secondary cell was made using $LiMn_2O_4$. The $LiMn_2O_4$ compound used was one which was prepared according to a liquid phase process and which had an average primary particle size of 1 $\mu m$ and an average secondary particle size of 3 $\mu m$.

Four types of carbon powders were used including Carbon Back CF9 having an average particle size of 0.04 $\mu m$ and a specific surface area of 60 $m^2/g$ (commercially available from Mitsubishi Kasei Corp.), Carbon Black 3050B having an average particle size of 0.04 $\mu m$, and a specific surface area of 50 $m^2/g$ (commercially available from Mitsubishi Kasei Corp.), Acetylene Black having an average particle size of 0.02 $\mu m$, and a specific surface area of 162 $m^2/g$ (commercially available from Denki Kagaku Kogyou Kabushiki Kaisha), and Ketjen Black having an average particle size of 0.03 $\mu m$ and a specific surface area of 1270 $m^2/g$ (commercially available from Lion Corp.)

Figure 8:
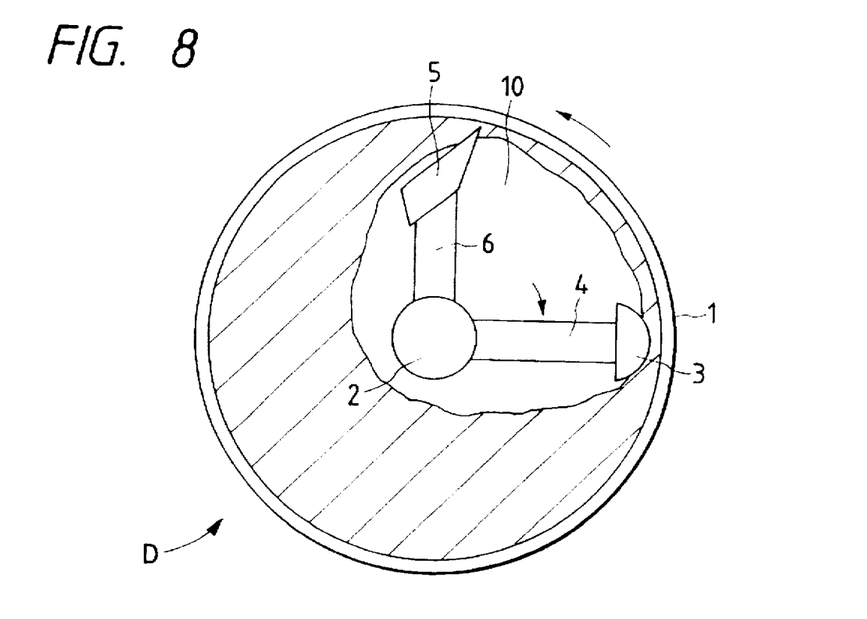
FIG. 8 is a schematic sectional view of a carbon film-forming device used in the examples.

Each carbon powder was covered on the particles of $LiMn_2O_4$ by mixing $LiMn_2O_4$ and the carbon powder and subjecting the mixed powder to the coverage by use of a carbon film-forming device D shown in FIG. 8. The device D includes a rotary drum 1 which has an inner diameter of 200 mm and an axial length of 70 mm and which has an inner space 10, and a first arm 4 having a compression shear head 3 in a semi-circular form. The head 3 is fixed to a fixed axles 2 provided in the inside of the drum 1 and extends closely to the inner circumferential surface of the drum 1. The device also has a second arm 6 which is fixed to the fixed axle 2 at a given angle relative to the first arm 4 and is positioned downstream of the first arm 4. The second arm 6 has a claw 5 extending closely to the inner circumferential surface of the drum 1. 250 g of the mixed powder was placed in the inner space 10 of the carbon film-forming device D. The rotary drum 1 was rotated at about 2000 r.p.m., for 30 minutes. In this condition, the mixed powder was applied with a compression shear stream between the inner circumferential face of the drum 1 and the compression shear head 3 while scraping off the compressed powder with the claw 5, thereby causing the surfaces of the $LiMn_2O_4$ particles with the carbon powder.

In this manner, the active materials of the invention could be made.

EXAMPLE 1
Preparation of active material:

Ketjen Black was provided as a carbon powder and $LiMn_2O_4$ was provided as a body of an active material. 97 wt% of $LiMn_2O_4$ and 3 wt % of Ketjen Black were mixed and the mixed powder was treated in the carbon film-forming device at about 2000 r.p.m. for 30 minutes to obtain an active material of the invention.

Figure 9:
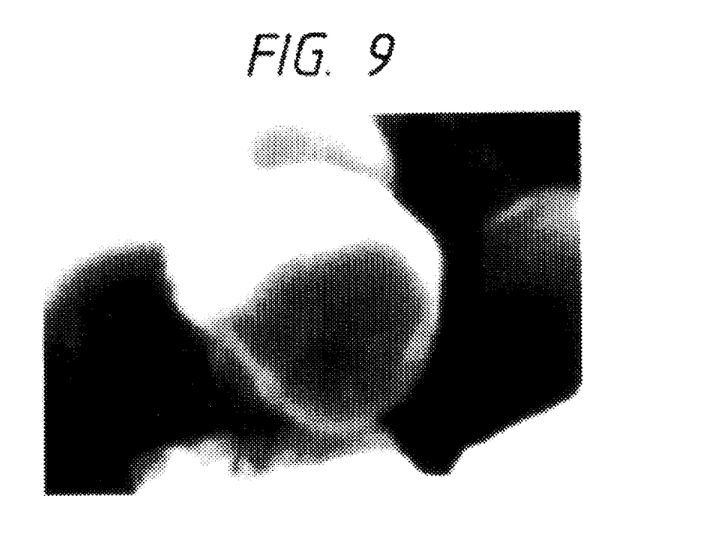
FIG. 9 is a scanning electron microphotograph showing a particulate structure of an active material having a carbon film thereon.
Figure 10:
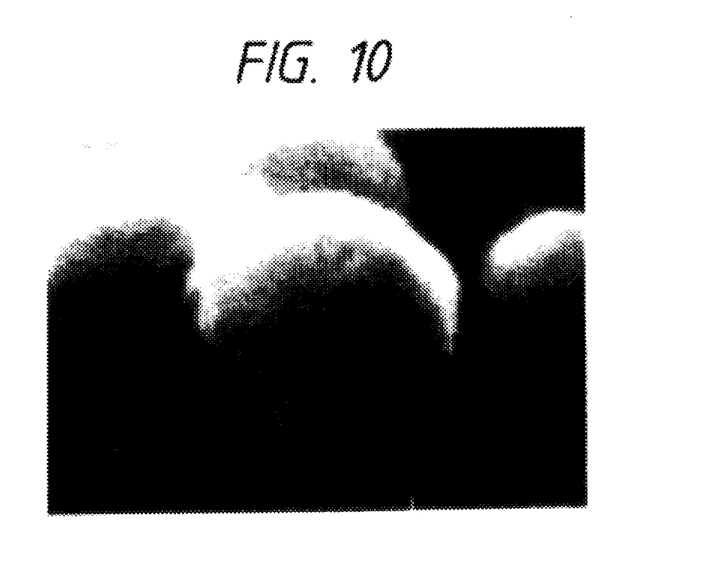
FIG. 10 is a schematic view showing the existence of carbon in a particulate structure of the active material of FIG. 9 as determined through the Auger electron spectroscopy.

The scanning electron microphotograph and the carbon map determined by the Auger electron spectroscopy of this active material are, respectively, shown in FIGS. 9 and 10. From these microphotograph and carbon map, it was confirmed that the carbon powder was uniformly covered on the surfaces of the round $LiMn_2O_4$ particles.

EXAMPLE 2
Fabrication of electrode A using the active material of Example 1:

In order to check the characteristic properties of the active material of Example 1, 97 parts by weight of the active material was mixed with 3 parts by weight of a polyvinylidene fluoride binder, to which 150 parts by weight of N-methyl-2-pyrrolidone was added as a solvent, followed by kneading to obtain a paste. The thus obtained paste was coated onto an Al foil current collector according to a doctor blade method and dried at 80° C. for 1 hour, followed by press molding at a compression pressure of 3 tons/cm² to obtain 0.1 mm thick electrode A.

The electrode A was punched into a disk having a diameter of 14 mm and dried in vacuum at 80–° C. for 4 hours, followed by transferring to a dry box wherein a button-shaped cell was made by a usual manner. A counter electrode used was made of metallic Li and a separator used was made of a finely porous polypropylene film (Cellguard 2400, commercial name of Hoechst Celanese). A liquid electrolyte used was a non-aqueous electrolytic solution which comprises 1M of $LiPF_6$ dissolved in a mixed solvent of propylene carbonate and dimethoxyethane at a mixing ratio by volume of 1:1.

The electrode was assessed in the following manner. The cell was charged at a constant current of 2 mA/cm² to a level of 4.1 V and further charged at a constant voltage of 4.1 V over 5 hours in total. The thus charged cell was discharged at 2 mA/cm² until it reached 2.0 V.

Figure 3:
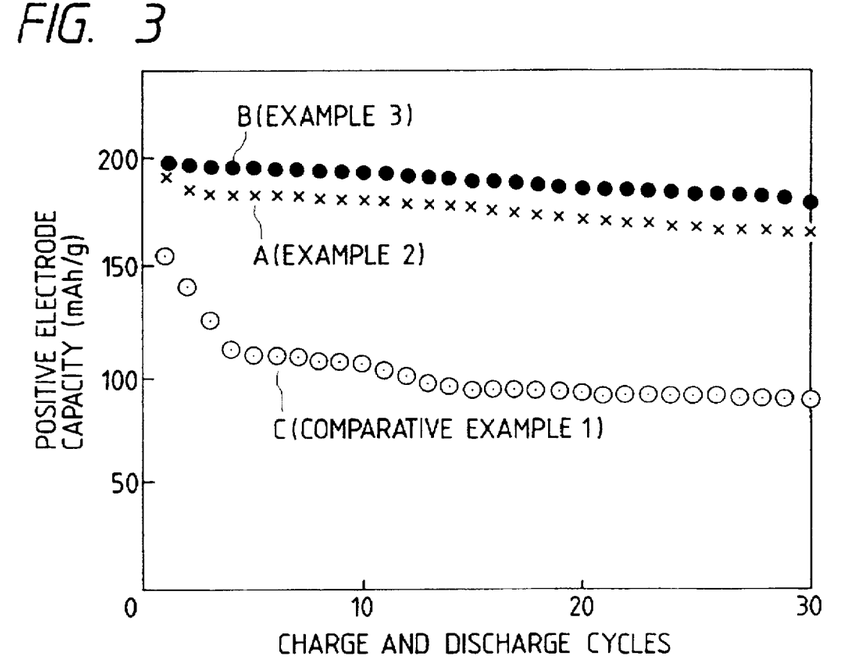
FIG. 3 is a graph showing the relation between the capacity and the charge and discharge cycles for different types of positive electrodes using active materials of the invention and an active material for comparison.

The relation between the positive electrode capacity of electrode A using the active material of Example 1 and the charge and discharge cycle is shown by symbol "x" and designated by A in FIG. 3. This electrode exhibited an initial capacity as high as 190 mAh/g and such a good cycle characteristic that the positive electrode capacity after 30 charge and discharge cycles was high at 165 mAh/g.

EXAMPLE 3
Fabrication of electrode B using the active material of Example 1:

97 parts by weight of the active material of Example 1, 3 parts by weight of a polyvinylidene fluoride binder, 22 parts by weight of graphite powder serving as a conducting agent and having an average size of 3.5 μm and a specific surface area of 34 m²/g, and 150 parts by weight of N-methyl-2-pyrrolidone as a solvent were mixed, followed by repeating the procedure of Example 1 or 2 to obtain electrode B. The electrode B differed from the electrode A in that 5 parts by weight of the graphite powder was further contained in the mixture.

The relation between the positive electrode capacity of the electrode B and the charge and discharge cycle is shown by symbol "●" and designated as B in FIG. 3.

The electrode B which further contained the graphite powder was found to be better in performance than the electrode A. Especially, as the cycles increase in number, the positive electrode capacity loss lowers. This is considered for the reason that the graphite powder added as a conductive agent can beneficially prevent the shortage of electric conductivity as will be caused by the expansion and contraction of the particles of the active material at the time of the charge and discharge cycles.

Comparative Example 1
Fabrication of electrode C using a known active material:

For comparison between a known active material and an inventive active material, particles of $LiMn_2O_4$ which were used as a body of an active material of the invention were employed as a known active material without any coverage with a carbon powder. 89 parts by weight of the particles of $LiMn_2O_4$, 8 parts by weight of such graphite powder as used in Example 3 and 3 parts by weight of a polyvinylidene fluoride binder were kneaded in 150 parts by weight of N-methyl-2-pyrrolidone solvent to obtain a paste. The paste was used in the same manner as to make the electrodes A and B, thereby obtaining electrode C.

The relation between the positive electrode capacity of the electrode C and the charge and discharge cycle is shown in FIG. 3 by symbol "○" and designated by C.

As will be apparent from the positive electrode capacity of the electrode C, the electrodes A and B of the invention are much better than the electrode C with respect to the capacity and are more unlikely to reduce in capacity as the cycles increase.

EXAMPLE 4
Relation between the positive electrode capacity and the coverage with a carbon powder:

In order to check the relation between the positive electrode capacity and the coverage with a carbon powder, the procedure of Example 1 was repeated except that the $LiMn_2O_4$ powder and ketjen black were formulated at different ratios and the time of processing with the carbon film-forming device were properly controlled to obtain six active materials having different carbon powder coverages (wherein a coverage of 100% means that the entire outer surfaces of the particles of $LiMn_2O_4$ were covered with the carbon powder). The six active materials were used to make six electrodes in the same manner as in Example 1 and each electrode was subjected to measurement of an initial positive electrode capacity. The results are shown in FIG. 4.

The coverage was calculated by subjecting the carbon map obtained according to the Auger electron spectroscopy to surface cleaning and then to image processing.

Figure 4:
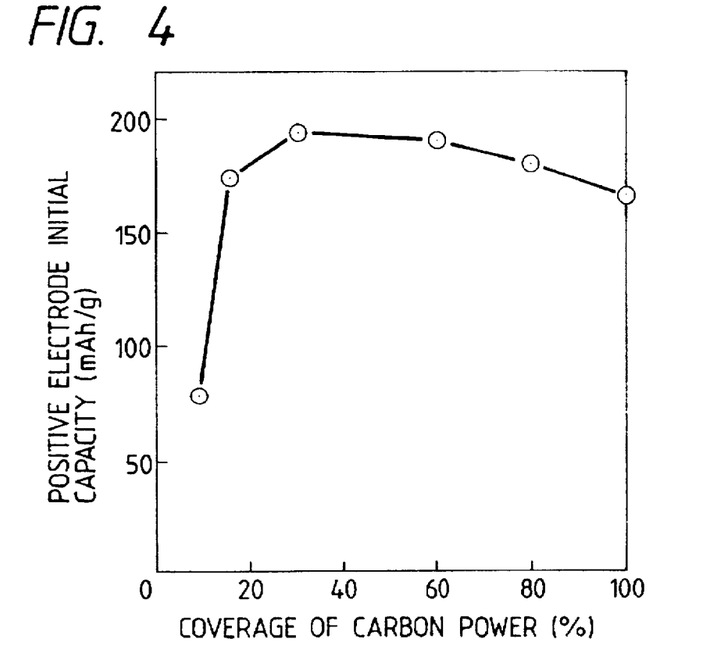
FIG. 4 is a graph showing the relation between the initial electrode capacity and the coverage of a carbon material on particles of a metal oxide.

As will be apparent from FIG. 4, the positive electrode initial capacity becomes maximal when the coverage is about 30%. As the coverage increases, the initial capacity gradually decreases. This is considered for the reason that when the coverage increases, the ratio by weight of the carbon powder increases. In contrast, when the coverage is up to about 20%, the initial capacity sharply increases with an increasing coverage. The results of FIG. 4 reveal that when the coverage is less than 15%, the initial capacity is too low. A stable, high initial capacity is ensured at a coverage of about 20 to 80%.

EXAMPLE 5

Relation between the positive electrode initial capacity and the covering thickness of a carbon powder:

In the same manner as in Example 4, while controlling the mixing ratio between the $LiMn_2O_4$ and the ketjen black and the time of processing with the carbon film-forming device, seven types of active materials having a coverage of 80% or more and different thicknesses of a carbon layer were made. It will be noted that an active material having a covering thickness of 0 mm was not processed with the carbon film-forming device and was composed of 100 parts by weight of $LiMn_2O_4$ powder alone. The thickness of the carbon layer was determined according to the Auger electron spectroscopic analysis using Ar sputtering along the depth of the layer.

The seven active materials were used to make seven electrodes in the same manner as in Example 1 and each subjected to measurement of a positive electrode initial capacity. The results are shown in FIG. 5.

Figure 5:
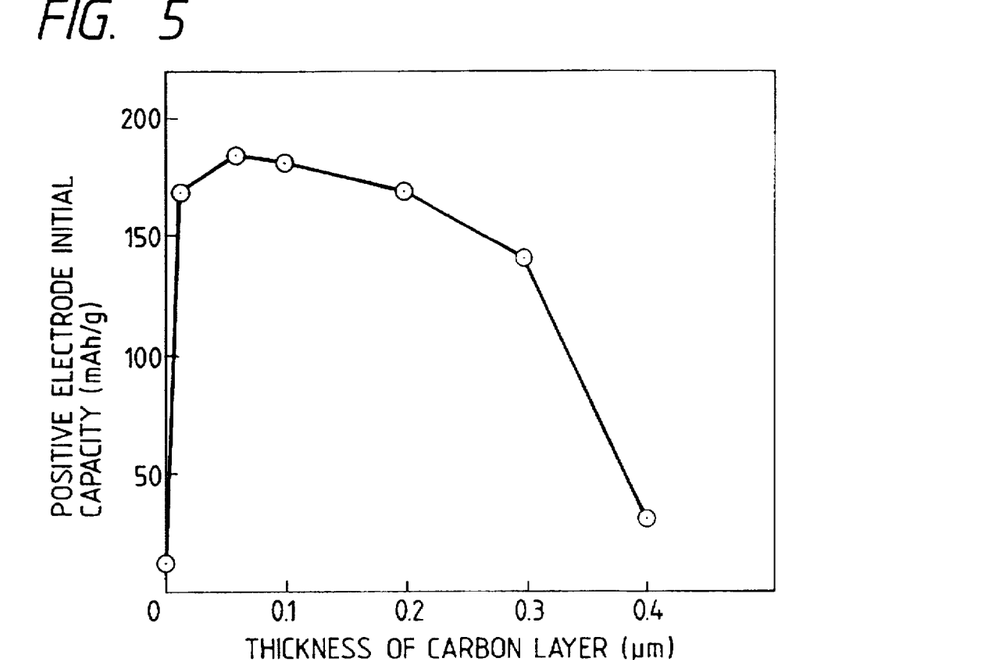
FIG. 5 is a graph showing the relation between the positive electrode initial capacity and the thickness of a carbon material covering particles of a metal oxide.

As will be apparent from FIG. 5, when the carbon layer is very thin at about 0.01 μm, the initial capacity is very great. As the layer thickness increases, the initial capacity lowers. The layer thickness for practical usage is in the range of from 0.01 to 0.3 μm. More particularly, it is considered that when the thickness exceeds 0.3 μm., lithium ions passing through the layer move only slowly. In order to permit electron conductivity and ion permeability, the thickness should preferably be in the range of 0.01 μm. to 0.2 μm.

EXAMPLE 6

Relation between the positive electrode initial capacity and the specific surface area of a starting carbon powder:

Four types of carbon black powders indicated prior to Example 1, a graphite powder as used in Example 2, and $LiMn_2O_4$ powder as used in the foregoing examples were used while controlling the mixing ratio between the $LiMn_2O_4$ powder and each carbon black powder and the time of processing with the carbon film-forming device. As a result, five types of active materials were prepared as having a coverage of approximately 60% and a carbon layer thickness of approximately 0.1 μm. but having different surface areas.

These five active materials were used to make five electrodes in the same manner as in Example 1, respectively, followed by measurement of an initial capacity. The results are shown in FIG. 6.

Figure 6:
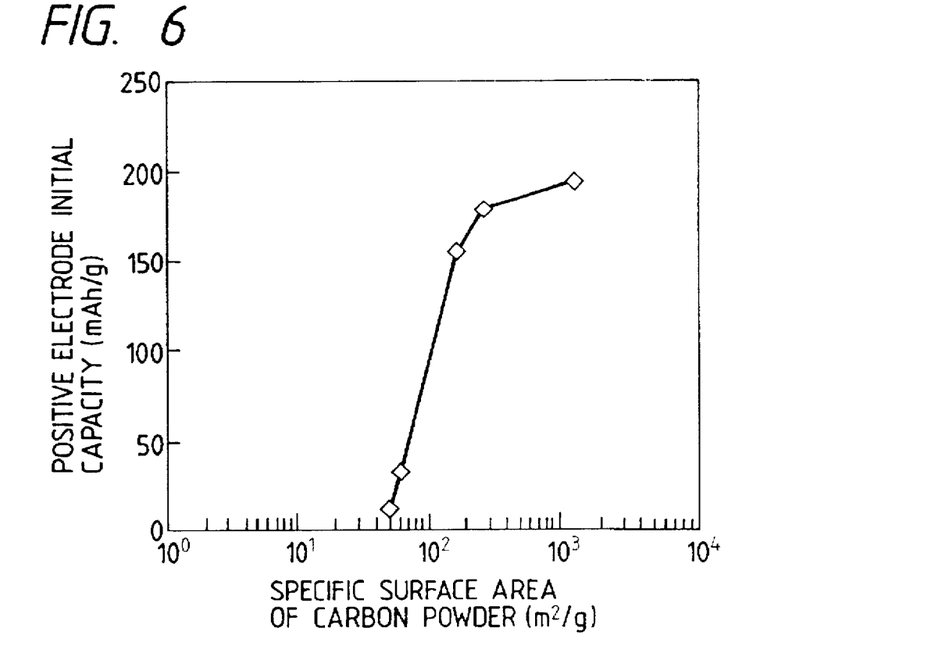
FIG. 6 is a graph showing the relation between the initial positive electrode capacity and the specific surface area of a carbon material covered on particles of a metal oxide.

As will be apparent from FIG. 6, the specific surface area of the starting carbon powder should preferably be 150 $m^2/g$ or over, more preferably 250 $m^2/g$ or over.

Needless to say, the specific surface area is one which is determined using a starting carbon powder prior to charge into the carbon film-forming device and differs from the specific surface area of an active material.

EXAMPLE 7

Relation between the positive electrode initial capacity and the specific surface area of an active material:

In order to check the relation between the positive electrode initial capacity and the specific surface area of a metal oxide covered with a carbon material, i.e. an active material, six $LiMn_2O_4$ powders having different particle sizes were provided. Each $LiMn_2O_4$ powder was mixed with such a ketjen black as used in Example 1 while controlling the mixing ratio and the time of processing the carbon film-forming device, thereby obtaining six types of active materials which had a coverage of approximately 60% and a layer thickness of approximately 0.1 μm but had different specific surface areas.

These six active materials were used to make six electrodes in the same manner as in Example 1, followed by measurement of a positive electrode initial capacity in the same manner as in Example 1. The results are shown in FIG. 7.

Figure 7:
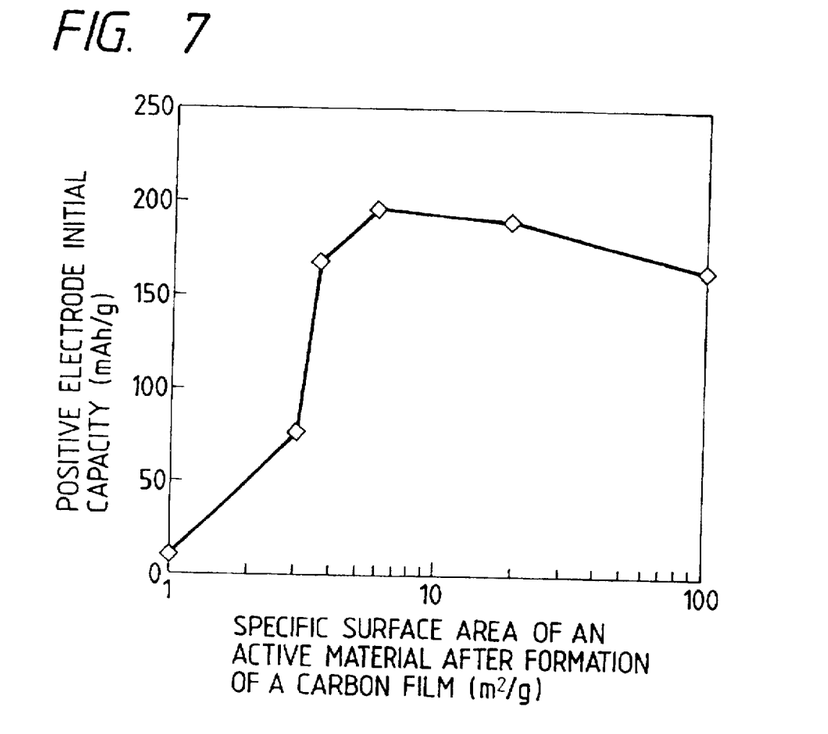
FIG. 7 is a graph showing the relation between the positive electrode initial capacity and the specific surface area of an active material.

As will be apparent from FIG. 7, when the active material has a specific surface area ranging from 3.5 $m^2/g$ to 100 $m^2/g$, a good initial capacity is obtained. When the specific surface area exceeds 100 $m^2/g$, the electrode lowers in strength.

What is claimed is:

1. An active material for a positive electrode of a secondary cell which comprises particles of a metal oxide and a conductive layer formed on the surfaces of individual particles of the metal oxide and made of a carbon powder which has a specific surface area of at least 150 $m^2/g$ when measured prior to the formation of the conductive layer, the conductive layer covering at least 15% of an apparent surface of the individual particles of the metal oxide and having a thickness ranging from 0.01 μm to 0.3 μm.

2. An active material according to claim 1, wherein said specific surface area of said carbon powder is in the range of 250 $m^2/g$ to 1500 $m^2/g$.

3. An active material according to claim 1, wherein said carbon powder consists of a member selected from the group consisting of ketjen black and acetylene black.

4. An active material according to claim 1, wherein said carbon powder covers said particles of the metal oxide at 15% to 80% of an apparent surface of said particles and has a thickness of 0.01 μm to 0.2 μm.

5. An active material according to claim 1, wherein said active material has a specific surface area ranging from 3.5 $m^2/g$ to 100 $m^2/g$.

6. An active material for a positive electrode of a secondary cell which comprises particles of a metal oxide and a conductive layer formed on the surfaces of individual particles of the metal oxide and made of a carbon powder, the conductive layer covering at least 15% of apparent surfaces of the individual particles of the metal oxide, having a thickness ranging from 0.01 μm to 0.3 μm, and having a specific surface area ranging from 3.5 $m^2/g$ to 100 $m^2/g$.

7. An active material according to claim 6, wherein said carbon powder covers said particles of the metal oxide at 15% to 80% of an apparent surface of said particles and has a thickness of 0.01 μm to 0.2 μm.

8. An active material according to claim 6, wherein the metal oxide is capable of doping and un-doping lithium and is at least one member selected from the group consisting of lithium manganese oxide, lithium nickel oxide, lithium iron oxide, lithium cobalt oxide, and manganese oxide.

9. An active material according to claim 6, wherein said carbon powder consists of a member selected from the group consisting of ketjen black and acetylene black.

10. A method for making an active material for a positive electrode of a secondary cell, which method comprising the steps of:

mixing particles of a metal oxide and a carbon powder having a specific surface area of at least 150 $m^2/g$; and     applying a compression shear stress to the resulting mixture to cover the surfaces of individual particles of the metal oxide with the carbon powder in a thickness of 0.01 μm to 0.3 μm so that at least 15% of an apparent surface of the individual particles is covered.

11. A positive electrode for a secondary cell which comprises a shaped body composed of particles of a metal oxide each of which has a conductive layer formed on the surfaces thereof, the conductive layer being made of a carbon material, and a resin binder for bonding the individual particles therewith, wherein the conductive layer covers at least 15% of an apparent surface of the individual particles and has a thickness ranging from 0.01 μm to 0.3 μm and a specific surface area ranging from 3.5 m²/g to 100 m²/g.

12. A positive electrode according to claim 11, wherein said carbon powder is a member selected from the group consisting of ketjen black and acetylene black.

13. A positive electrode according to claim 11, wherein said conductive layer covers said particles of the metal oxide at 15% to 80% of an apparent surface of said particles and has a thickness of 0.01 μm to 0.2 μm.

14. A positive electrode according to claim 11, wherein said conductive layer further comprise a graphite powder.

15. A non-aqueous electrolytic secondary cell which comprises a negative electrode made of lithium as an active material, a positive electrode which comprises a metal oxide capable of doping and un-doping lithium as an active material, a separator for separating the negative electrode and the positive electrode from each other, and a non-aqueous liquid electrolyte impregnated in the negative electrode, the positive electrode and the separator, wherein the metal oxide is in the form of particles which individually have a conductive layer made of a carbon material in such a way that individual particles are covered with the conductive layer at 15% or more of an apparent surface thereof and that the conductive layer has a thickness ranging from 0.01 μm to 0.3 μm and a specific surface area ranging from 3.5 m²/g to 100 m²/g.

16. A non-aqueous electrolytic secondary cell according to claim 15, wherein said carbon powder is a member selected from the group consisting of ketjen black and acetylene black.

17. A non-aqueous electrolytic secondary cell according to claim 15, wherein said conductive layer covers said particles of the metal oxide at 15% to 80% of an apparent surface of said particles and has a thickness of 0.01 μm to 0.2μm.

* * * * *